US009356874B2

(12) United States Patent
Poulin

(10) Patent No.: US 9,356,874 B2
(45) Date of Patent: May 31, 2016

(54) SYSTEMS, METHODS, AND COMPUTER PROGRAM PRODUCTS FOR CONGESTION CONTROL OF MEDIA GATEWAY RESOURCES

(71) Applicant: GENBAND US LLC, Frisco, TX (US)

(72) Inventor: Eric Poulin, Pierrefonds (CA)

(73) Assignee: GENBAND US LLC, Frisco, TX (US)

( * ) Notice: Subject to any disclaimer, the term of this patent is extended or adjusted under 35 U.S.C. 154(b) by 159 days.

(21) Appl. No.: 14/134,921

(22) Filed: Dec. 19, 2013

(65) Prior Publication Data

US 2015/0180781 A1 Jun. 25, 2015

(51) Int. Cl.

| | |
|---|---|
| ***H04L 12/66*** | (2006.01) |
| ***H04L 12/803*** | (2013.01) |
| ***H04L 12/26*** | (2006.01) |
| ***H04L 29/06*** | (2006.01) |

(52) U.S. Cl.

CPC .............. *H04L 47/125* (2013.01); *H04L 12/66* (2013.01); *H04L 43/0882* (2013.01); *H04L 43/16* (2013.01); *H04L 65/103* (2013.01); *H04L 65/1043* (2013.01); *H04L 65/80* (2013.01)

(58) Field of Classification Search

None

See application file for complete search history.

(56) References Cited

U.S. PATENT DOCUMENTS

| | | | | |
|---|---|---|---|---|
| 6,711,159 | B1 | 3/2004 | Grabelsky et al. | |
| 6,799,210 | B1 * | 9/2004 | Gentry et al. | 709/223 |
| 7,486,621 | B2 | 2/2009 | Bessis et al. | |
| 2004/0240389 | A1 * | 12/2004 | Bessis et al. | 370/252 |
| 2007/0121673 | A1 * | 5/2007 | Hammer | 370/468 |
| 2008/0109652 | A1 * | 5/2008 | Zhu | 713/153 |

OTHER PUBLICATIONS

ITU-T Study Group 16, "Series II: Audiovisual and Multimedia Systems, Infrastructure of audiovisual services—Communication procedures. Gateway control protocol: Media gateway resource congestion handling package," ITU-T Recommendation H.248.10, Jul. 29, 2001, 10 pages, ITU International Telecommunication Union.

"Series H: Audiovisual and Multimedia Systems, Infrastructure of audiovisual services—Communication procedures. Gateway control protocol: Detailed congestion reporting package," ITU-T Recommendation H.248.32, Mar. 2013, 14 pages, ITU International Telecommunication Union.

* cited by examiner

*Primary Examiner* — Alex Skripnikov

(74) *Attorney, Agent, or Firm* — Haynes and Boone, LLP

(57) ABSTRACT

A method is disclosed for managing a plurality of resources in a media gateway, the method comprising: determining that a utilization of a resource exceeds a first threshold, wherein the resource is one of the plurality of resources; determining a reduction in load to communicate to a media gateway controller (MGC) coupled to the media gateway, wherein the reduction is based on the resource and the first threshold; and sending a message indicating the reduction and the resource to the MGC.

14 Claims, 4 Drawing Sheets

SYSTEMS, METHODS, AND COMPUTER PROGRAM PRODUCTS FOR CONGESTION CONTROL OF MEDIA GATEWAY RESOURCES

TECHNICAL FIELD

The present description relates, in general, to computer systems that manage media resources and, more specifically, to techniques for control of resources in media gateways.

BACKGROUND

Internet protocol (IP) networks and other types of networks, such as asynchronous transfer mode (ATM) networks or time division multiplexing (TDM) networks, can be used to carry data for different types of calls, such as voice and video communications and conferencing, and streaming services, including audio and video streaming. For example, communication of audio may use a suitable digital audio format, such as MP3, and communication of video may use any suitable digital video format, such as those defined by H.264/MPEG-4 Part 10. Media gateways may be used to provide for transmission of media between disparate communications networks, e.g., by converting digital media calls between disparate communications networks. For example, a media gateway may perform different types of services for transmission of calls, including transcoding, transrating, and encryption.

The volume of media traffic carried by communications networks continues to increase at a rapid pace, giving rise to a need for media gateways to provide ever greater capability to handle media traffic. Thus, there is a continuing need to manage the resources on media gateways as efficiently as possible.

BRIEF DESCRIPTION OF THE DRAWINGS

The present disclosure is best understood from the following detailed description when read with the accompanying figures.

SUMMARY

Figure 1:
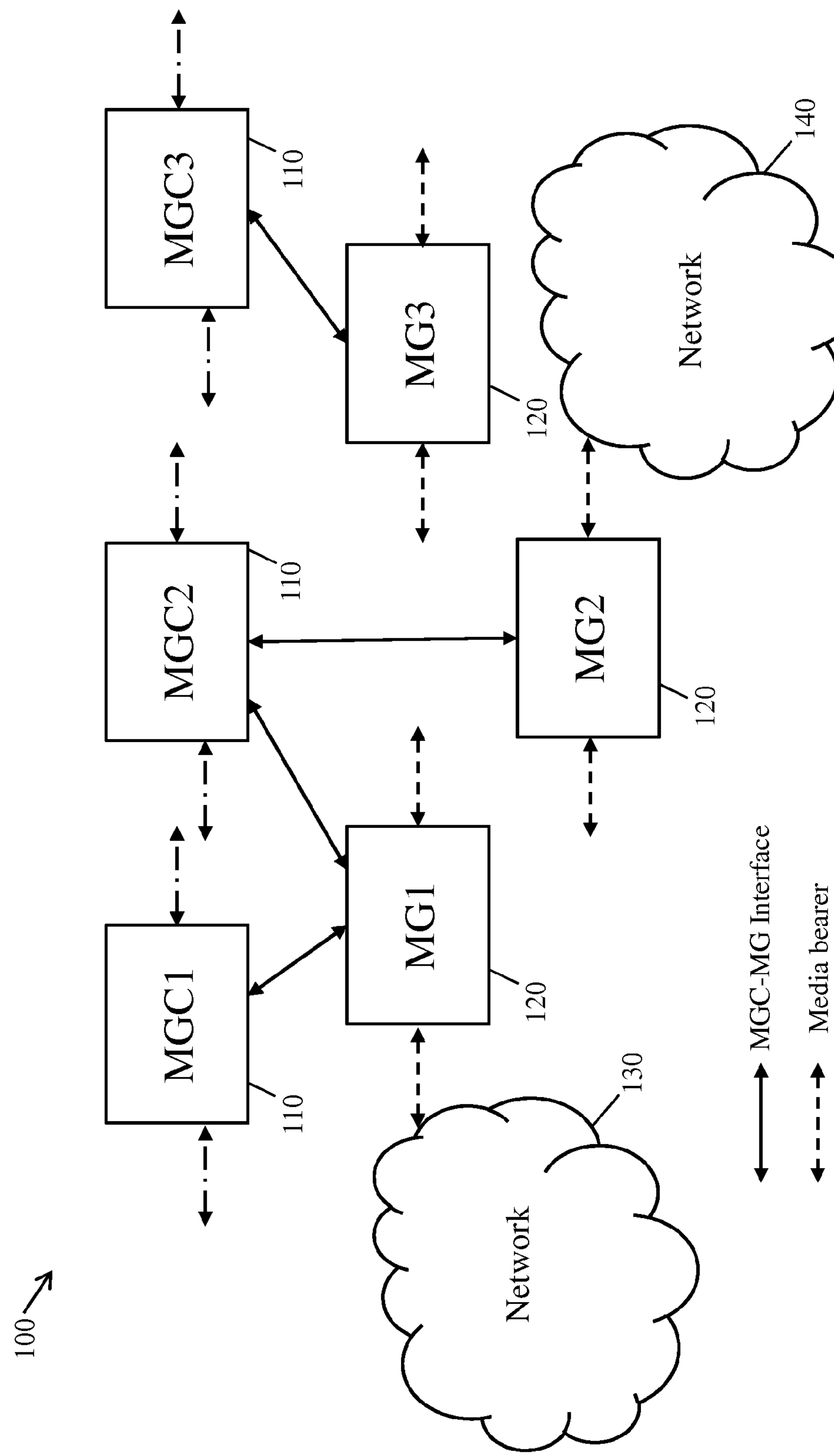
FIG. 1 illustrates an example network architecture.

According to one embodiment, a method is disclosed for managing a plurality of resources in a media gateway, the method comprising: determining that a utilization of a resource exceeds a first threshold, wherein the resource is one of the plurality of resources; determining a reduction in load to communicate to a media gateway controller (MGC) coupled to the media gateway, wherein the reduction is based on the resource and the first threshold; and sending a message indicating the reduction and the resource to the MGC.

According to another embodiment, a system is disclosed comprising: a media gateway configured to couple to an MGC, the media gateway comprising: a plurality of resources comprising a digital signal processing resource, a cryptographic resource, an internet protocol (IP) resource, and an asynchronous transfer mode (ATM) resource; a processor configured to: monitor a utilization for each of the plurality of resources; determine that a resource in one of the plurality of resources is congested based on a corresponding one of the utilizations; and in response to determining that the resource is congested, determine a reduction in load to communicate to the MGC, wherein the reduction is based on the resource and the utilization of the resource; and a transceiver configured to send a request to the MGC, wherein the request comprises the reduction and an indication of the type of the resource.

According to another embodiment, a computer program product is disclosed having a computer readable medium tangibly recording computer program logic for managing a plurality of resources in a media gateway coupled to a first MGC and a second MGC, the computer program product including: code to determine whether a first utilization of a first resource resides in a range of values, wherein the first resource is one of the plurality of resources; code to, in response to determining that the first utilization resides in the range of values, select which of the first MGC and the second MGC should be sent a request to reduce a load corresponding to the first resource, wherein the selection is based on types of calls controlled by each MGC in the media gateway, and wherein the request comprises a requested percentage reduction in the load; and code to send the request to the selected MGC.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

ITU-T Recommendation H.248.10, entitled "Gateway control protocol: Media gateway resource congestion handling package", suggests an approach to address resource capacity overload conditions in media gateways (MGs). The approach suggested by H.248.10 involves arbitrary global congestion thresholds that, when attained, trigger an MG to request that a controlling media gateway controller (MGC) reduce the load towards the MG. The request contains a parameter that represents a percentage of the load that the MGC is requested to block (rejects or deflects to another MG). A limitation of this approach is that it targets only congestion of general resources used by all calls in a MG.

Various embodiments disclosed herein include systems, methods, and computer program products for providing resource congestion control in media gateways. Congestion control may be accomplished by recognizing that different resources in a media gateway (MG) may be consumed by different types of calls controlled by different media gateway controllers (MGCs). Resources in a MG include digital signal processing (DSP) resources for transcoded calls or streams, cryptographic resources, such as hardware accelerators, for encryption and other security measures, internet protocol (IP) resources, asynchronous transfer mode (ATM) resources, and resources that are consumed for any type of MG calls, including main processor or central processing unit (CPU) resources and available bandwidth. For the purposes of congestion control, resources are classified as one of two types: (1) resources that are used on a subset of MG calls (e.g., DSP for transcoded calls, hardware accelerator for encryption, dedicated IP hardware, and dedicated ATM hardware); and (2) resources for servicing any type of MG call (e.g., main processor CPU and link bandwidth). Furthermore, a MG may be controlled by more than one MGC, in which case the MG has better information about resource consumption in the MG and which MGC is responsible for calls consuming the various types of resources. That is, an MG is in a better position than any controlling MGC to determine what type of reduction must be applied by the MGC since the MG is the only entity that knows how its resources are used and which MGC (s) use the resources. Thus, various resources in a MG can be monitored by the MG, and the MG can make a request to at least one MGC that indicates a requested reduction in usage corresponding to the congested resource. In some embodiments, an MGC receiving a request for a reduction knows the types of calls that have the largest impact on the indicated resource and therefore can deflect (e.g., either re-route or block) those types of calls.

FIG. 1 illustrates an example network architecture 100 in which the present approaches may be incorporated. The network architecture 100 comprises a plurality of media gateways MGs, labeled as MG1-MG3 120, and a plurality of MGCs, labeled as MGC1-MGC3 110. Communication paths between various nodes are indicated by various line types in FIG. 1. The architecture 100 may further comprise a plurality of endpoints (not shown) that transmit and receive calls. Examples of endpoints include IP private branch exchanges (PBXs), session border controllers, telephones (both analog and digital types), a session initiation protocol (SIP) proxy, a wireless base station controller (BSC), and MGC-MG interfaces. An endpoint sends signaling data to an associated MGC, such as MGC1 110, to set-up or control calls. Once a call is configured, the endpoint communicates call traffic via a MG, such as MG1 120. An MGC controls all or part of a MG through a control MGC-MG interface or application programming interface (API). For example, the MGC-MG interface may be based on ITU-T H.248. In an embodiment, a MG 120 is coupled to one or more networks, such as networks 130 and/or 140, in addition to one or more other MGs 120. The networks 130 and 140 may use any type of network protocol, such as IP or ATM.

Regardless of the source of a call entering a MG 120 via a media bearer, the MG 120 can perform various services for the call. As an example, an MG 120 can perform transcoding and/or transrating of a call between disparate networks or devices. As one of ordinary skill in the art would appreciate, transcoding includes conversion between different transmission and/or coding types, and transrating includes bit-rate conversion. For example, representative MG, such as MG1 120, may receive a call from network 130, wherein the call uses a first type of encoding, and transcode the call into a second type of encoding for communication to another MG, another network, or an endpoint. Likewise, MG1 120 may in addition or alternatively encrypt and/or perform another form of security on the call for communication to another MG, another network, or an endpoint. For example, MG1 120 may use secure real-time transport protocol (SRTP) to provide encryption and authentication. In this example, a "call" may include any communication of digital data over a connection between end users, such as a voice conversation, a multimedia session, or any combination thereof.

Calls in and among the various MGs 120 can be coordinated by the MGCs 110. In case of congestion on one of its controlled MGs the MGC can deflect or distribute the load across the remaining MGs. The MGCs 110 can communicate with each other via call signaling. The MGCs 110 can be directly connected to each other or connected to each other through intermediate nodes or other MGCs.

The control of MGs by MGCs can take various forms, and representative examples are presented in FIG. 1. For example, a single MG can be controlled by more than one MGC, as explained further below. For example, MG1 120 is controlled by MGC1 and MGC2. Furthermore, a single MGC can control all or part of more than one MG, e.g., MGC2 110 controls part of MG1 120 and all of MG2, and MGC3 110 controls all of MG3120. These are representative examples, and generally an MG can be controlled by any number of MGCs, and an MGC can control any number of MGs.

Figure 2:
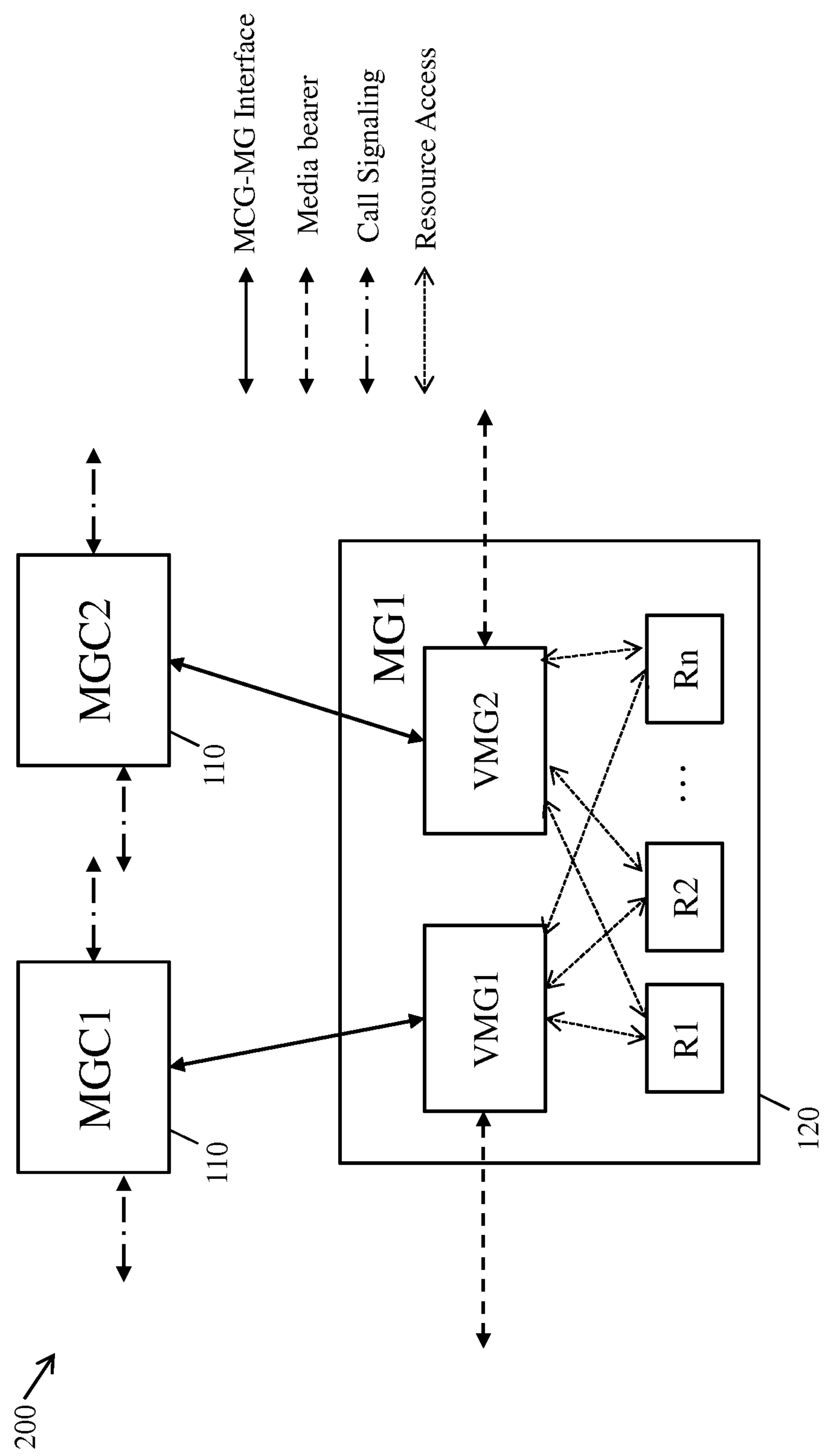
FIG. 2 illustrates an embodiment of a detailed view of the example network architecture.

FIG. 2 illustrates an embodiment of a detailed view 200 of the example network architecture 100. The detailed view 200 focuses on the control of MG1 120 by MGC1 110 and MGC2 110. A MG can be divided into any number of virtual media gateways (VMGs), and each of the VMGs has access to and shares all or a portion of the resources of the MG described herein. A VMG is a logical entity that performs the functions of a MG such as, for example, terminating call control messages and dynamically allocating and de-allocating resources needed for specific tasks. VMGs compete for a shared pool of resources in a MG. Each VMG may also have its own dedicated resources.

According to H.248 a MG can be connected to at most one MGC, while a MGC may be connected to any number of MG's. Even though the H.248 protocol does not have an explicit mechanism to support multiple MGCs controlling a physical MG, it has been designed to support multiple logical MGs (within a single physical MG) that can be associated with different MGCs, via use or creation of VMGs. In an embodiment, a single physical MG can be controlled by more than one MGC, provided that the physical MG has been virtually portioned so it looks to the MGCs as if this MG was in fact two different MGs. This can be done by creating two different identifiers (referred to as CIDs) for each virtual MG so they appear as two MGs to the MGCs even though the two MGs are indeed on one physical MG.

As illustrated in FIG. 2 MG1 120 is divided into VMG1 and VMG2, each of which has access to the media gateway resources labeled as R1, R2, . . . Rn, where n is an integer greater than 0 As discussed earlier, the resources of an MG include DSP resources, cryptographic and other security-related processing resources (referred to herein as "crypto" resources), IP resources that transport packets on an IP network (e.g., hardware used to provide terminations with the media address type IP4 or IP6), ATM resources that transport packets on an ATM network (e.g., hardware used to provide terminations with the media network type of ATM), and general resources including central processing unit (CPU) resources, one or more types of memory, and link bandwidth (e.g., measured in bits/sec). General resources may be classified as those that are needed to service any type of call, whereas the other resources are those that may be used on only a subset of MG calls. For example, in some embodiments, DSP resources are used primarily for calls that require transcoding, and crypto resources are used primarily for calls that require speech encryption. One of ordinary skill in the art will recognize that there could be other types of resources available. The media bearers illustrated coupled to VMG1 and VMG2 can be logical media bearers that share bandwidth in a physical link.

Each VMG is controlled by a different MGC. One MGC may not be aware that another MGC is sharing the same resources on a MG. For example, each of MGC1 110 and MGC2 110 may not be aware that the other MGC is sharing resources on MG1 120. It may be the case that only the MG is aware that its resources are being shared by more than one MGC. Thus, in the control of MG resources, a MG may be better placed than an MGC to decide what type of reduction in load should be applied and by how much. If a MG is controlled by more than one MGC, the MG can select different reductions in load for each MGC.

Figure 3:
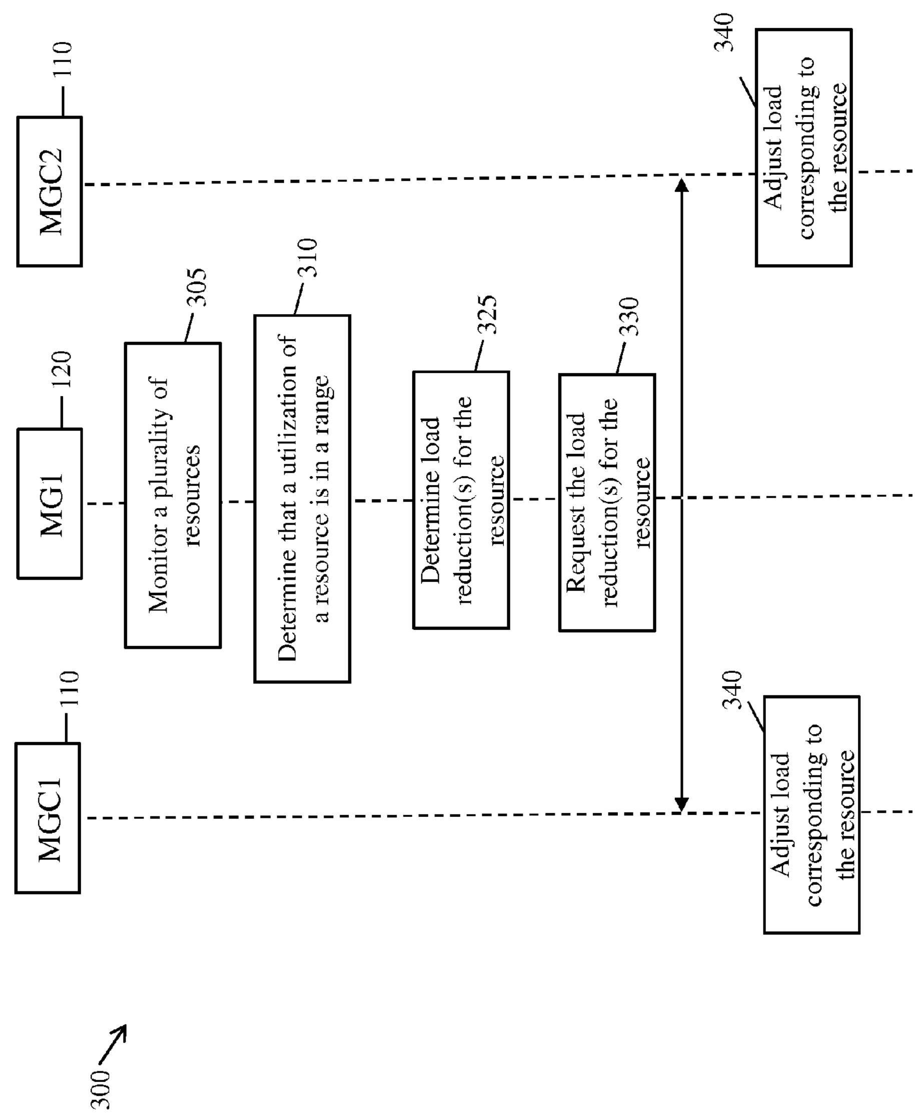
FIG. 3 illustrates an example method, adapted according to one embodiment.

FIG. 3 illustrates an embodiment of a method 300 for congestion control in a network. The method 300 is illustrated using a protocol diagram involving MGC1 110, MGC2 110, and MG1 120. As shown in FIG. 2, MG1 120 is controlled by both MGC1 110 and MGC2 110, and traffic controlled by both MGCs has access to the resources of MG1. In action 305, MG1 120 monitors each of a plurality of resources. The monitored resources include any combination of DSP resources, crypto resources, IP resources, ATM resources, general resources such as CPU or link bandwidth, or any other type of suitable resource utilized in a MG to facilitate call flow. In at least one embodiment, the utilization is measured in terms of a percentage. For example, a utilization of "x" for a resource means that the resource is at "x %" utilization. As understood by a person of ordinary skill in the art, utilization of DSP, crypto, IP, ATM, and other resources may be measured in a variety of well understood ways. For example, available DSP resources on a MG may be measured in million instructions per second (MIPS), and current utilization may be MIPS used on average over some time period. Available IP resources may be measured in terms of capacity to serve IP traffic in bits/sec or number of voice over IP (VoIP) calls, and utilization may be the average number of VoIP calls over some time period as a percentage of capacity.

In action 310, MG1 120 determines that a utilization of a resource is in a range of values. After the utilization is determined, in one embodiment whether the utilization is in a range and an action to be taken is determined from a lookup table stored in the MG. In action 310, the range may be such that at least one MGC should be notified to adjust a load. In action 325, MG1 120 determines load reductions for each of MGC1 110 and MGC2 110. In action 325, the MG and its VMGs may use call statistics such as the calls per second (CPS), the average hold time (AVHT), call types (codecs used, features used, etc.) applied by each VMG for each resource to decide the reduction percentage that would the most rapidly resolve the congestion condition. For a more concrete example embodiment, suppose for example MGC1 110 is making 100 CPS with an AVHT of 2 minutes on MG1 120 (using VMG1) while MGC2 is only making 10 CPS at 1 min AVHT on MG1 120 (using VMG2), and that all calls are transcoded and therefore using DSP resources. Knowing that MGC1 is mainly responsible for the overload condition and also knowing that reducing the call rate from MGC1 would be much more helpful to resolve the overload condition than asking the same from MGC2, the MG may request a larger reduction from MGC1 (by sending a notification or request message) as compared with MGC2. Therefore, in an embodiment MG1 120 may request reductions from both MGC1 110 and MGC2 110, but with a larger reduction from MGC1 110 than MGC2 110, in which case a request would also be transmitted to MGC2 110. For example, MG1 120 may request a reduction of 50% from MGC1 110 and reduction of 10% from MGC2 110 as applied to calls that consume DSP resources. Thus, a MG may determine call statistics for calls directed by each MGC that controls the MG and select reductions based on call statistics. Alternatively, in this example, the determined load reduction for MGC2 110 may be zero, so there may be no reason to send a load reduction request to MGC2 110.

In an embodiment, the load reduction is derived from one or more lookup tables stored in MG1 120. An example table of DSP utilization and corresponding reduction percentages is presented in Table 1. In this example, Table 1 is stored in each MG and used to select reduction percentages for various levels of DSP utilization. For example, if it is determined that DSP utilization is between 80% and 90% in action 310 and there is one MGC controlling the MG, a load reduction is determined in action 325, and a request is sent to the MGC in action 330 to request a 25% reduction in calls that utilize the DSP resource. Reductions may be requested from different MGCs to effect the 25% reduction in a scenario in which there are multiple MGCs controlling a MG. Any level of utilization above the lowest threshold can be considered a congestion condition. In some embodiments, there are potentially mappings of reduction percentages to resource utilization for each type of resource. For example, there may be different tables stored for each resource with different reduction percentages versus utilizations. That the MG makes the selection of reduction percentage emphasizes that the MG is a better place to decide how much reduction percentage to apply than any MGC.

Furthermore, for any given resource, there can be different mappings depending on the type of congestion for the given resource. For example, suppose a DSP resource is congested at a certain level. If the DSP resource is congested due to the CPU, congestion may be requested to be reduced by X percent, but if the DSP resource is congested due to DSP internal bandwidth congestion, congestion may be requested to be reduced by Y percent, where the values of X and Y are potentially different. A DSP resource is used as an illustrative example, but the same concept applies to other resources. The potential for this type of selection further emphasizes that a MG is better positioned to decide how much reduction percentage to apply than any MGC.

Techniques to determine a load reduction are not limited to consulting lookup tables and may use parameters other than DSP usage. Other embodiments may use a formula or other intelligence to generate a load reduction request number from any appropriate resource usage parameter. In fact, any appropriate technique to calculate or otherwise determine a load reduction request number is within the scope of embodiments.

TABLE 1

| Percentage of DSP Resource Used | Reduction Percentage Sent to MGC |
|---|---|
| 80% | 25% |
| 90% | 60% |
| 95% | 90% |

In action 330, MG1 120 requests load reductions from the MGCs 110. There is potentially a request for each of the controlling MGCs. A request in 330 comprises at least one message that indicates both a load reduction and a type of resource. Finally in action 340, MGC1 110 adjusts the load corresponding to the resource indicated in the notification message in action 330 and according to the indicated reduction percentage. Likewise, MGC2 110 adjusts it load according to the indicated resource and the reduction percentage indicated for MGC2 110. In this example, a focus is placed on MGC1 110 for illustration with the understanding the MGC2 110 takes similar actions. The load is adjusted by MGC1 110 by either blocking calls that consumes the resource or redirecting calls to another MG at the rate specified by the reduction percentage. If calls are redirected to other MGs, in one embodiment calls are redirected until the resource of interest in the other MGs is congested as well, in which case transcoded calls are rejected by the MGC1 110. MGC1 110 communicates with at least one other MGC to redirect calls to the at least one other MGC, but as stated earlier MGC1 110 may instead block calls to adjust a load, in which case MGC 110 does not necessarily communicate with another MGC.

By way of another example, suppose 90% of MG1's 120 DSP resources and 90% of MG1's crypto resources are being utilized and suppose that MGC1 110 is primarily responsible for calls that consume DSP resources and MGC2 110 is primarily responsible for calls that consume crypto resources. Using the method 300 illustrated in FIG. 3, MG1 120 could notify MGC1 110 of a call reduction percentage that MGC 110 could apply to calls that heavily consume DSP resources, and MG1 120 could notify MGC2 110 of a smaller call reduction percentage for its calls that consume DSP resources. Likewise, MG1 120 could notify MGC2 110 of a call reduction percentage that MGC2 110 could apply to calls that heavily consume crypto resources, and MG1 120 could notify MGC1 110 of a smaller call reduction percentage for its calls that consume crypto resources.

Similarly, by way of further example, suppose 90% of MG1's 120 IP resources and 90% of MG1's ATM resources are being utilized and suppose that MGC1 110 is primarily responsible for the IP calls in MG1 120 and MGC2 110 is primarily responsible for the ATM calls in MG1 120. Using the method 300 illustrated in FIG. 3, MG1 120 would notify MGC1 110 of a reduction percentage to apply to IP calls, and MG1 120 would notify MGC2 110 of a reduction percentage to apply to ATM calls.

Various embodiments may add, omit, rearrange, or modify the actions of method 300. For example, as one of ordinary skill in the art would readily recognize, if an MG is controlled by only one MGC, the method 300 is simplified in that communications with a second MGC and actions taken by a second MGC are not performed. Furthermore, in an embodiment, if another MG has not been registered under an MGC, then calls are rejected, otherwise calls are deflected to one or more other registered MGs, until the one or more other MGs become congested for the same type of resources, in which case calls are rejected at that point. Finally, the actions 310-340 in FIG. 3 may be repeated for each of the plurality of resources.

If the resource in action 310 is a general resource, the MGC responsible for the most calls in general may be selected in action 320. In at least one embodiment, for general resources, the selected MGC would adjust overall load to MG1 120, without distinguishing between types of calls. In at least one other embodiment, general resources can be further subdivided, e.g., into CPU and bandwidth resources because some types of calls require a lot of bandwidth but not a lot of CPU resources and vice versa. For example, in a lawful intercept wiretapping scenario a call can be tapped by many different agencies, in which case the call consumes a disproportionate share of bandwidth as opposed to CPU resources. Therefore, instead of indicating a resource as a "general" resource to an MGC, the resource may be indicated as "bandwidth" or "CPU".

An MG determines resource utilization for each resource type at various times, e.g., at predefined time intervals, for example every second or minute, or a trigger may occur within the MG when utilization of a resource exceeds predefined thresholds. Regardless, actions 310-340 can be repeated when utilization of a resource changes numerical ranges such that a load needs to be adjusted, at periodic times, or based on any appropriate setting.

The approach of method 300 is superior to conventional approaches, such as the approach outlined in ITU-T Recommendation H.248.10, which was described previously. The approach of H.248.10 does not discriminate between types of resources, so the approach of H.248.10 applies only to general congestion in MGs. By adding to the ITU-T Recommendation H.248.10 a "source" parameter (either proprietary or by requesting an update to the standard) to H.248 (e.g., to the H.248 message referred to as Congestion Event), an MG could inform an MGC of the particular component or resource of the MG being congested. The MGC could then offload the MG by a specified reduction percentage but only if a new call requires using the congested component (for example if DSP utilization is at 80%, offload the DSP of this MG by sending transcoded call to a secondary MG, and still process non-transcoded calls on the primary MG). In a distributed model where a single physical MG can be broken down in a plurality of VMGs, located on different Advanced Telecommunications Computing Architecture (ATCA) blades, and can be controlled by many MGCs, this solution would allow for better use of the resources available. Example syntax for a request or notification message from an MG to an MGC that revises H.248.10 to include a "source" parameter is as follows. In the notation that follows, "Reduction=x" implies a requested reduction percentage of x % for the resource type indicated, which is DSP in this example.

```
MEGACO/1 [MG.X.COM]
Transaction = 235 {
    Context = - {
        Notify=ROOT{
            ObservedEvents=56{
                chp/MGCon{
                    Reduction =x,
                    Source=DSP}
}}}}
```

In an embodiment, a notified MGC need only to perform per resources type of congestion management if the congestion "source" is known by both the MGC and the MG. In the examples previously presented the known "source" indicator would indicate DSP resources, crypto resources, IP resources, ATM resources, or general resources. In cases where an unknown congestion source was received, or if the source event was not specified, every new call can be deflected or prevented at the rate specified by the reduction percentage as if they were general congestions. Thus, the MGC would be able to apply congestion control even if unaware of the source of the problem (in this case applying general resource congestion management on the unknown sources), ensuring compatibility with MGCs that do not support specific resource indications.

Figure 4:
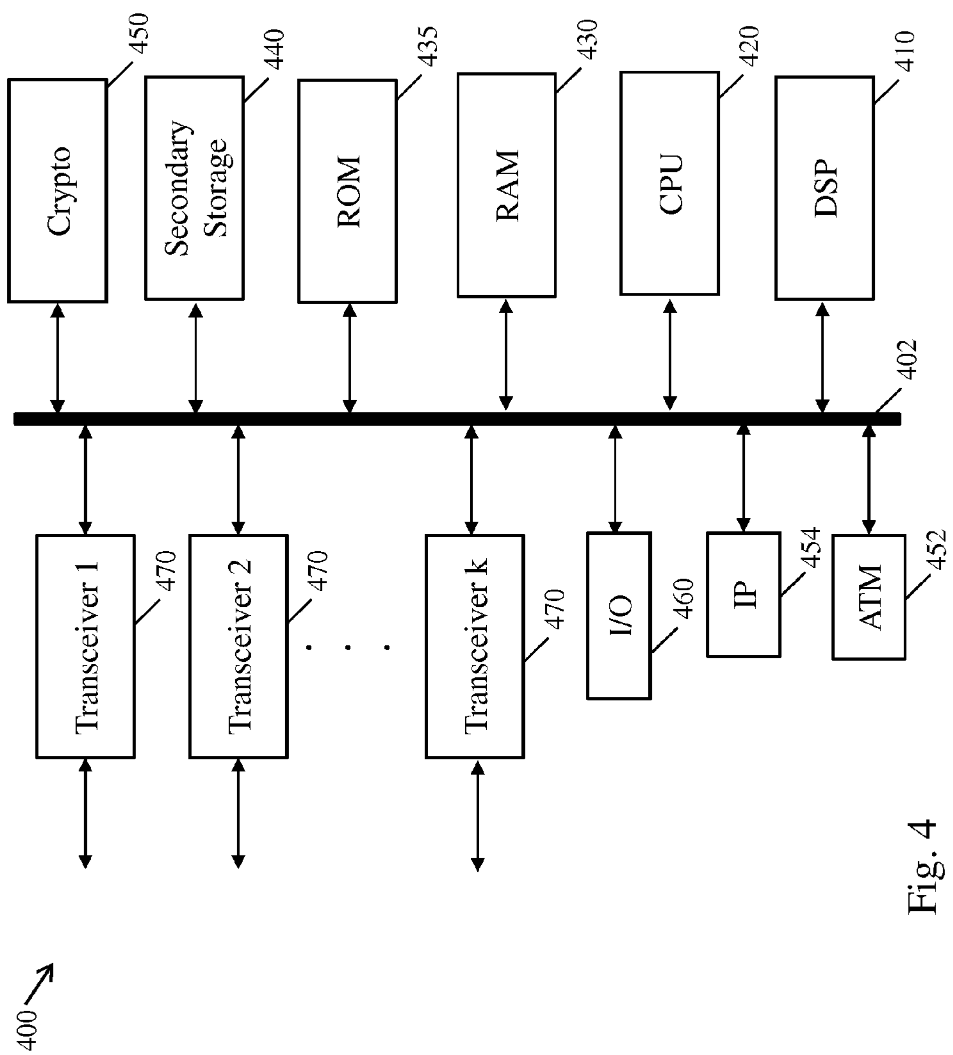
FIG. 4 illustrates an example system, adapted according to one embodiment.

FIG. 4 illustrates an example computer system 400 adapted according to one embodiment of the present disclosure. The computer system 400 comprises an example system on which embodiments of the present disclosure may be implemented (such as an MG and an MGC). The computer system 400 comprises a digital signal processor (DSP) 410, a central processing unit (CPU), a random access memory (RAM) 430, a read-only memory (ROM) 435, secondary storage 440, crypto resources 450, dedicated IP communications hardware 454, dedicated ATM communications hardware 452, input/output (I/O) devices 460, and a plurality of transceivers 470, all of which may be communicatively coupled via a bus 402. The CPU 420 may be implemented using hardware or a combination of hardware and software. Although illustrated as a single CPU, the CPU 420 is not so limited and may comprise multiple processors. The CPU 420 may be implemented as one or more processors, i.e., as one or more chips, cores (e.g., a multi-core processor), field-programmable gate arrays (FPGAs), and/or application specific integrated circuits (ASICs). Likewise, the DSP 410 may be implemented as more than one DSP chip. The DSP 410 may perform transcoding or transrating of a media stream or call flow received by a transceiver 470. Crypto resources 450 may include a hardware accelerator for performing security features such as encryption or authentication of a media stream or call flow received by a transceiver 470.

The secondary storage 440 may comprise one or more disk drives or tape drives and is used for non-volatile storage of data and as an over-flow data storage device if the RAM 430 is not large enough to hold all working data. The RAM 430 may be static RAM, dynamic RAM, or the like, and the ROM 435 may be programmable ROM (PROM), erasable PROM (EPROM), electrically EPROM (EEPROM), or the like. The secondary storage 440 may be used to store programs that are loaded into the RAM 430 when such programs are selected for execution. The ROM 435 is used to store instructions and perhaps data that are read during program execution. The ROM 435 is a non-volatile memory device that typically has a small memory capacity relative to the larger memory capacity of the secondary storage. The RAM 430 is used to store volatile data and perhaps to store instructions. Access to both the ROM 435 and the RAM 430 is typically faster than to the secondary storage 440.

In an embodiment, the computer system 400 includes a plurality of transceivers, labeled as transceiver 1 470 through transceiver k 470, where k is an integer greater than one. There may be a transceiver 470 for each communication line (e.g., electrical or optical) coupled to the computer system 470. A transceiver 470 may be bidirectional or unidirectional, depending on the embodiment. Each transceiver 470 is adapted to couple computer system 400 to a communication link (e.g., a wired or wireless communication link). The CPU 420 is adapted to monitor bandwidth usage (e.g., measured in bits/sec averaged over a period of time) of the various communications links. The computer system 400 may be coupled to only one communications link, in which case there is only one transceiver 470.

The I/O devices 460 may include a keyboard, a computer mouse, a microphone, and/or a display device for allowing a user to provide input to and receive output from the computer system 400.

It is understood that by programming and/or loading executable instructions onto the computer system 400, at least one of the CPU 420, the RAM 430, and/or the secondary storage 440 are changed, transforming the computer system 400 in part into a particular machine or apparatus (e.g., MG1 120 or MGC1 110) having the functionality taught by the present disclosure. The executable instructions may be stored on the RAM 430 or secondary storage 440 and loaded into the CPU 420 for execution. A VMG may be implemented as a software application running on the CPU 420 and using the RAM 430, the ROM 435, and/or secondary storage 440. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus. Logic may be encoded in a non-transitory computer-readable medium, such as RAM 430 and/or secondary storage 440. Such a medium can take many forms, including but not limited to, non-volatile media and volatile media. In various implementations, non-volatile media includes optical or magnetic disks, such as secondary storage 440, and volatile media includes dynamic memory, such as various types of RAM 430. CPU 420 reads application code from the readable medium and executes the code to provide the described functionality.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for managing a plurality of resources in a media gateway, the method comprising:

determining that a utilization of a resource exceeds a first threshold, wherein the resource is one of the plurality of resources;

determining a reduction in load to communicate to a media gateway controller (MGC) coupled to the media gateway, wherein the reduction is based on the resource and the first threshold, wherein the media gateway is controlled by a first MGC and a second MGC, wherein the MGC is one of the first MGC and the second MGC; and sending a message indicating the reduction and the resource to the MGC;

determining a second reduction in load to send to another one of the first MGC and the second MGC, wherein determining the reduction and determining the second reduction comprises:

determining first call statistics for calls directed by the first MGC;

determining second call statistics for calls directed by the second MGC; and comparing the first call statistics to the second call statistics, wherein the reduction and the second reduction are based on a history of current types of calls controlled by each MGC in the media gateway.

2. The method of claim 1, further comprising monitoring the plurality of resources, wherein the plurality of resources comprises a digital signal processing resource, a cryptographic resource, an internet protocol (IP) resource, and an asynchronous transfer mode (ATM) resource.

3. The method of claim 1, further comprising:

receiving the message by the MGC; and adjusting a load of calls directed to the media gateway known to consume the resource.

4. The method of claim 3, wherein the resource is a digital signal processing resource, and wherein adjusting the load of calls comprises redirecting calls that require transcoding to another media gateway.

5. The method of claim 1, wherein the media gateway comprises:

a first virtual media gateway (VMG) controlled by a first MGC; and a second VMG controlled by a second MGC, wherein each of the first VMG and the second VMG shares the plurality of resources, and wherein the utilization is due to the combined actions of the first VMG and the second VMG.

6. A system comprising:

a media gateway configured to couple to a plurality of media gateway controllers (MGCs) including a first MGC and a second MGC, the media gateway comprising:

a plurality of resources comprising a digital signal processing resource, a cryptographic resource, an internet protocol (IP) resource, and an asynchronous transfer mode (ATM) resource;

a processor configured to:

monitor a utilization for each of the plurality of resources;

determine that a resource in one of the plurality of resources is congested based on a corresponding one of the utilizations; and in response to determining that the resource is congested, determine reductions in load for each of the plurality of MGCs according to types of calls controlled by each MGC in the media gateway, wherein the reductions are based on the resource and the utilization of the resource;

determining first call statistics for calls directed in the media gateway by the first MGC;

determining second call statistics for calls directed in the media gateway by the second MGC; and determining a larger reduction in load for the first MGC than the second MGC due to call statistics indicating the first MGC controls calls with a larger effect on the resource than the second MGC; and a transceiver configured to send a request to the first MGC, wherein the request comprises the corresponding reduction and an indication of the type of the resource.

7. The system of claim 6, wherein the media gateway further comprises:

a first virtual media gateway (VMG) configured to be controlled by the first MGC;

a second VMG configured to be controlled by the second MGC, wherein each of the first VMG and the second VMG shares the plurality of resources, and wherein the corresponding one of the utilizations is due to the combined actions of the first VMG and the second VMG.

8. The system of claim 6, further comprising:

the MGC, wherein the MGC is configured to:

receive the request; and adjust a load of calls controlled by the MGC known to consume the resource on the media gateway.

9. The system of claim 8, wherein the resource is a digital signal processing resource, and wherein adjusting the load of calls comprises redirecting calls that require transcoding to another media gateway.

10. A computer program product having a non-transitory computer readable medium tangibly recording computer program logic for managing a plurality of resources in a media gateway coupled to a first media gateway controller (MGC) and a second MGC, the computer program product comprising:

code to determine whether a first utilization of a first resource resides in a range of values, wherein the first resource is one of the plurality of resources;

code to, in response to determining that the first utilization resides in the range of values, select which of the first MGC and the second MGC should be sent a request to reduce a load corresponding to the first resource, wherein the selection is based on types of calls controlled by each MGC, and wherein the request comprises a requested percentage reduction in the load;

code to send the request to the selected MGC;

code to establish a first virtual media gateway (VMG) on the media gateway, wherein the first VMG is controlled by the first MGC;

code to establish a second VMG on the media gateway, wherein the second VMG is controlled by the second MGC;

wherein each of the first VMG and the second VMG shares the plurality of resources, and wherein the first utilization is due to the combined actions of the first VMG and the second VMG;

code to determine first call statistics for calls directed by the first MGC;

code to determine second call statistics for calls directed by the second MGC; and code to select between the first MGC and the second MGC by comparing the first call statistics to the second call statistics.

11. The computer program product of claim 10, further comprising:

code to determine the requested percentage reduction in the load.

12. The computer program product of claim 10, further comprising:

code to, subsequent to determining that the first utilization resides in a range of values, determine that the first utilization no longer resides in the range of values; and code to send an update to the selected MGC to cease reducing the load corresponding to the first resource.

13. The computer program product of claim 10, further comprising:

code to determine that a second utilization of a second resource exceeds a second threshold, wherein the second resource is one of the plurality of resources; and code to, in response to determining that the second utilization exceeds the second threshold, select which of the first MGC and the second MGC should be sent a second request to reduce a load corresponding to the second resource, wherein the selection is based on types of calls controlled by each MGC, and code to send the second request to the corresponding selected MGC.

14. The computer program product of claim 10, wherein the plurality of resources comprises a digital signal processing resource, a cryptographic resource, an internet protocol (IP) resource, and an asynchronous transfer mode (ATM) resource.

* * * * *